(12) United States Patent
Li

(10) Patent No.: US 7,478,971 B2
(45) Date of Patent: Jan. 20, 2009

(54) SHELF CONNECTOR

(76) Inventor: Xiangming Li, Room 301, No. 66, Yuejin Road, Jiangmen, Guangdong 529070 (CN)

( * ) Notice: Subject to any disclaimer, the term of this patent is extended or adjusted under 35 U.S.C. 154(b) by 100 days.

(21) Appl. No.: 10/597,727

(22) PCT Filed: Aug. 19, 2005

(86) PCT No.: PCT/CN2005/001304

§ 371 (c)(1),
(2), (4) Date: Aug. 4, 2006

(87) PCT Pub. No.: WO2006/047924

PCT Pub. Date: May 11, 2006

(65) Prior Publication Data

US 2007/0161280 A1 Jul. 12, 2007

(30) Foreign Application Priority Data

Nov. 5, 2004 (CN) .................. 2004 1 0052080
Jun. 27, 2005 (CN) .................. 2005 1 0035488

(51) Int. Cl.
*E04G 7/18* (2006.01)
(52) U.S. Cl. .................. 403/398; 403/386; 108/147.13; 108/147.14; 108/147.15; 211/187; 211/190; 248/219.4; 248/230.4

(58) Field of Classification Search ............ 108/147.11, 108/147.12, 147.13, 147.14, 147.15, 147.17, 108/147, 14, 15, 17; 211/182, 187, 190, 211/207; 403/188, 386, 398; 248/219.4, 248/222.13, 229.13, 230.4
See application file for complete search history.

(56) References Cited

U.S. PATENT DOCUMENTS

| 4,615,278 | A | * | 10/1986 | Cabrelli | 108/147.13 |
| 4,656,952 | A | * | 4/1987 | Schweizer | 108/147.13 |
| 4,750,626 | A | * | 6/1988 | Nicely | 211/187 |
| 6,015,052 | A | * | 1/2000 | Goldberg et al. | 211/187 |
| 6,044,988 | A | * | 4/2000 | Yang | 211/187 |
| 6,068,143 | A | * | 5/2000 | Wang | 211/187 |
| 6,253,933 | B1 | * | 7/2001 | Yang | 211/187 |

* cited by examiner

*Primary Examiner*—Michael P Ferguson

(57) ABSTRACT

A shelf connector includes a sliding sleeve and a locking sleeve. The sliding sleeve is formed with a locking body thereon. The locking body is provided with an open groove along the axial direction of the sliding sleeve. The locking body is provided on both sides of the open groove with clasping portions. The locking sleeve is provided with a locking groove thereon. After the clasping portion is inserted into the locking groove, the width of the open groove can be reduced. With the above arrangement, in assembling, the sliding sleeve can be conveniently positioned to any suitable position of the supporting rod and locked thereto with the insertion of the locking sleeve. Since the locking sleeve itself has mounting portions for mating with the frame body of the shelf, or the locking sleeve itself is the end portion of the frame body of the shelf, the connection of the whole shelf becomes very simple. By using various connectors having different specifications and purposes, it is suitable for connecting various kinds of shelf.

7 Claims, 14 Drawing Sheets

SHELF CONNECTOR

BACKGROUND OF THE INVENTION

1. Field of the Invention

The present invention relates to a shelf connector, and in particular to a shelf connector capable of mounting on a shelf.

2. Description of Prior Art

In daily life, a shelf constituted of brackets, hangers or supports has been widely used. However, due to the different specifications of various kinds of shelves, it is inconvenient to connect with each other and the assembling of the total structure is very complicated. In view of the above problems, China Patent Publication No. CN2503777Y discloses a shelf connector comprising a supporting rod, a connector and a net bracket. The supporting rod is axially provided with several positioning grooves at identical intervals. The connector is formed of two arc pieces. Both sides of the two arc pieces are provided with male and female engaging members, respectively, so as to form a cone after engaging with each other. The cone has a mouth portion tapering from bottom to top. The interior of the cone mates with the positioning grooves on the supporting rods, and its outside mates with the conical wall within the sleeve of the net bracket.

With the above structure, although the height between two shelves can be adjusted according to the conditions in use, the disassembling and assembling procedures are very troublesome. First, the sleeve of the net bracket and the connector should be separated. Next, the connector is disassembled into two portions. Then, these two portions are moved to another position to lock with the supporting rod. Finally, with the insertion of the sleeve, the assembling procedure is finished. In order to guarantee the stability of the shelf in use, it is necessary for the connector to tightly mate with the positioning elements via the sleeve.

In view of the above problem, China Patent Publication No. CN2608739Y discloses an improved shelf connector comprising a fixing sleeve, a clamping sleeve and a positioning sleeve. The positioning sleeve is a cone which can be opened and closed and are formed of two semi-arc bodies. The inner surface of the positioning sleeve is provided with projecting ribs, and the periphery of its bottom is provided with flanges having notches. On one side of the notch, the bottom of the flange is provided with steps. The clamping sleeve and the positioning sleeve are assembled with each other. The hook thereof is inserted into the positioning sleeve and rotates to engage with the stepped flanges of the positioning sleeve. The fixing sleeve is assembled to the outside the clamping sleeve.

However, the above structure still has the drawbacks as follows: (1) Since the net bracket and the sleeve are integrally connected, the assembling of multiple layers of shelves is restricted. That is, the shelves on both ends of the shelf pillar are easy to be dissembled whereas the shelves in the middle are not easy to assemble or dissemble; (2) Since the connection relies on the locking of conical surfaces, the supporting pillars and the shelf connectors are assembled more tightly due to the gravity after using a period of time. Therefore, it is very difficult to detach the fixing sleeve from the fixing sleeve; (3) The manufacturing of the connector formed of the fixing sleeve and the clamping sleeve is more complicated, resulting in the rise of the manufacture cost of the shelf.

SUMMARY OF THE INVENTION

In order to solve the above problems of existing arts, the object of the present invention is to provide a shelf connector. The shelf connector is suitable for connecting to various kinds of shelves having different specifications and purposes. Further, the shelf connector is very convenient to dissemble and assemble and the connection is reliable. Moreover, additional layers of shelves or other accessories can be easily assembled without detaching any part of the shelf structure. As a result, the use of the shelf is greatly enlarged.

In order to achieve the above objects, the shelf connector of the present invention comprises a sliding sleeve and a locking sleeve. The sliding sleeve is provided with a locking body thereon. The locking body is provided with an open groove along the axial direction of the sliding sleeve. The locking body is provided on both sides of the open groove with clasping portions. The locking sleeve is provided with a locking groove thereon. After the clasping portion is inserted into the locking groove, the width of the open groove can be reduced.

In the present invention, preferably, the width b of the locking groove is slightly smaller than the width a of the clasping portion. The upper portion of the clasping portion is provided with introducing sections. The introducing section is an arc transition section tapering from bottom to top.

Preferably, the locking body is a projecting portion radially extending from the sliding sleeve.

Preferably, the sliding sleeve is formed into an open structure. The wall face opposing to the open groove is axially provided with a hinge functioning as a shaft-and-pin mechanism. The inner wall of the hole of the sliding sleeve is circumferentially provided with positioning ribs. The positioning ribs are formed into strips or grains and are intermittently arranged. The inner diameter of the positioning rib is slightly smaller than the outer diameter of the supporting rod. The outer edge of the supporting rod is circumferentially provided with positioning grooves for elastically engaging with the positioning ribs. The inner wall of the hole of the sliding sleeve adjacent to the hinge is axially provided with a rib for positioning the opening and closing actions.

Preferably, the inner wall of the hole of the sliding sleeve is circumferentially provided with a layer of elastic soft rubber. Alternatively, the whole inner wall of the hole of the sliding sleeve is a rough wall face.

Preferably, the clasping portion is a protruding one. The locking groove is provided with a locking edge for restricting the movement of the locking sleeve along the radial direction of the sliding sleeve after the locking sleeve is locked into the protruding clasping portion.

Preferably, the locking sleeve can be a flat plane, arc plate or angled plate. The locking groove is arranged in a vertical or transverse direction of the locking sleeve. The opening of the groove is arranged in an upward, downward, leftward or rightward orientation.

Preferably, the locking sleeve is a rod. The locking groove can be formed by means of bending the rod.

In the present invention, since the locking body of the sliding sleeve is provided with a through open groove thereon and the locking mechanism constituted of the locking sleeve and the sliding sleeve is utilized, the locking mechanism can reduce the width of the open groove to shrink inwardly after the locking sleeve is inserted into the clasping portion provided on the locking body of the sliding sleeve. Therefore, in assembling, the sliding sleeve can be conveniently positioned to any place of the supporting rod. Then, the insertion of the locking sleeve can fix it thereto. Further, since the locking sleeve has mounting portions for mating with the frame body of the shelf, or the locking sleeve itself is an end portion of the frame body of the shelf, the connection of the whole shelf becomes very simple. By using various connectors having different specifications and purposes, it is suitable for connecting various kinds of shelf. Meanwhile, in the present invention, other shelves can be additionally mounted on the shelf according to the conditions in use. Therefore, the functions and the field of application of the shelf can be extended.

The further description of the present invention will be made with reference to the accompanying drawings.

DETAILED DESCRIPTION OF THE INVENTION

Figure 1:
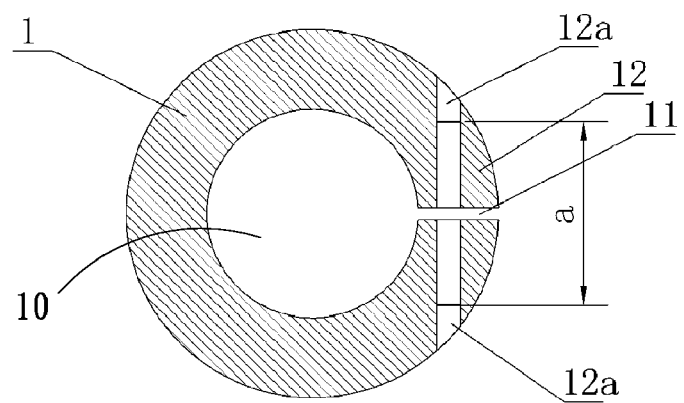
FIG. 1 is a cross-sectional view of the sliding sleeve of the present invention.
Figure 2:
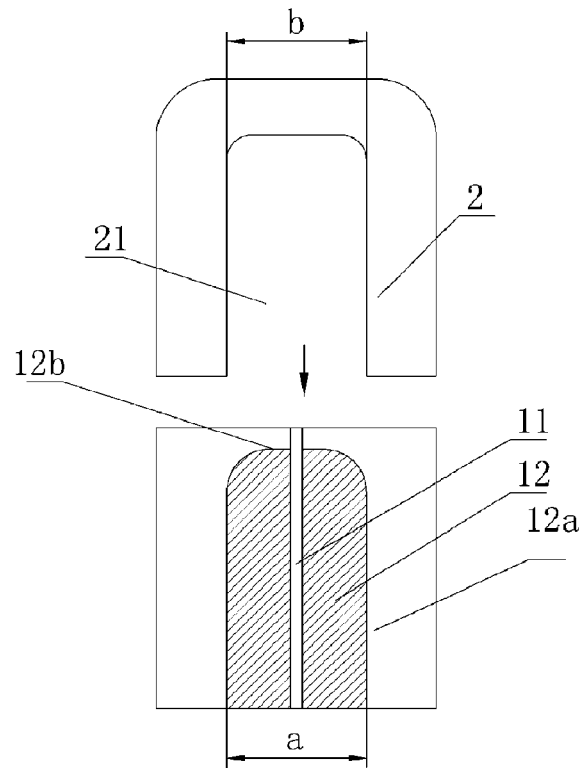
FIG. 2 is a schematic view showing that the locking body of the sliding sleeve and the locking sleeve of the present invention are connected to each other.
Figure 7:
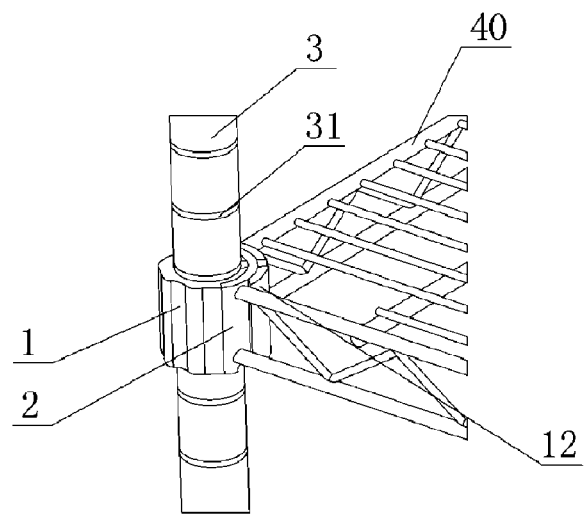
FIG. 7 is an assembled view showing that the first embodiment of the present invention is applied to a net-like shelf.
Figure 27:
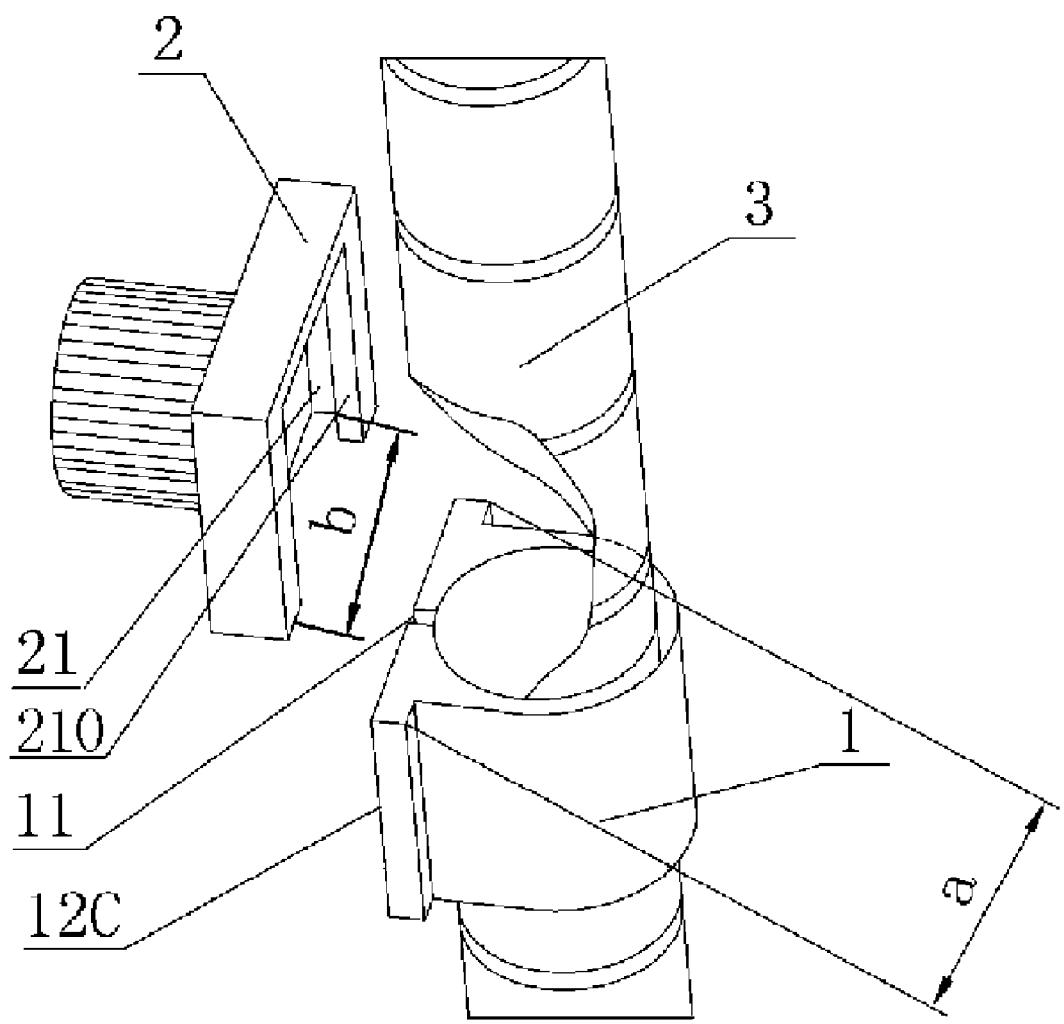
FIG. 27 is a schematic view showing the assembling of the sliding sleeve and the locking sleeve in the eleventh embodiment of the present invention when the clasping portion is a protruding one.

As shown in FIGS. 1 and 2, the present invention provides a shelf connector comprising a sliding sleeve 1 and a locking sleeve 2. The sliding sleeve 1 is inserted on a supporting rod 3. One end of the locking sleeve 2 is connected to the frame body 40 of the shelf (as shown in FIG. 7). The center of the interior of the sliding sleeve 1 is formed with a hole 10 for slidably mating with the supporting rod 3. The outer surface of the sliding sleeve 1 is formed with a locking body 12. The locking body 12 is provided with an open groove 11 along the axial direction of the sliding sleeve 1. The locking body 12 is provided on both sides of the open groove 11 with clasping portions 12a or 12c (the clasping portion 12c is shown in FIG. 27). The clasping portion can be a recessed clasping portion 12a or a protruding clasping portion 12c.

Figure 5:
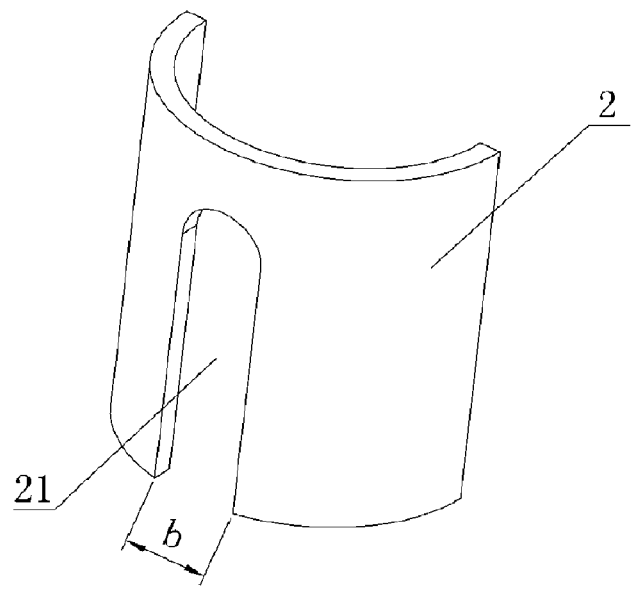
FIG. 5 is a perspective view showing the external appearance of the locking sleeve of the present invention.

Further, as shown in FIG. 5, the locking sleeve 2 can be semi-arc plate and is provided with a locking groove 21 on its plate body. After the clasping portion 12a or 12c is inserted into the locking groove 21, the open groove 21 can be shrunk inwardly to reduce its width. Therefore, with a locking mechanism constituted of the sliding sleeve 1 and the locking sleeve 2, the supporting rod 3 can be firmly connected to the frame body 40 of the shelf. The locking groove 21 can be a U-shaped locking groove. After the recessed clasping portion 12a or protruding clasping portion 12c is locked into the locking groove, the open groove 11 shrinks inwardly to reduce its width. Further, the width b of the locking groove 21 is slightly smaller than the width a of the recessed clasping portion 12a or the protruding clasping portion 12c. Above the clasping portion 12a or the clasping portion 12c, introducing sections 12b are provided respectively (not shown in FIG. 27). The introducing section 12b is an arc transition section tapering from bottom to top (as shown in FIG. 2).

Figure 3:
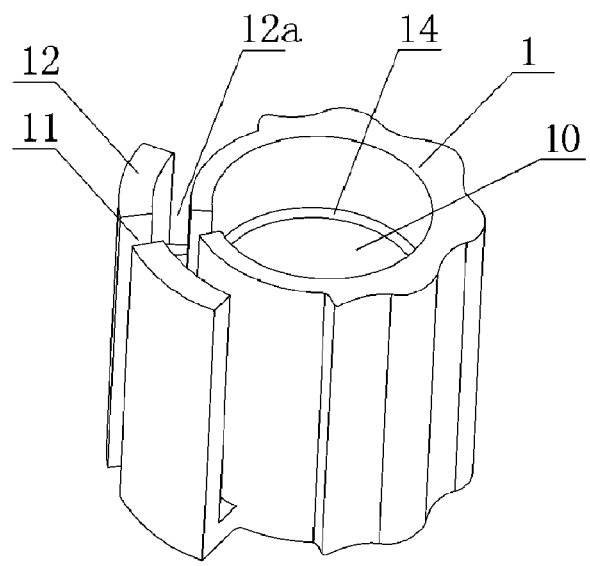
FIG. 3 is a perspective view showing the external appearance of the sliding sleeve of the present invention.
Figure 4:
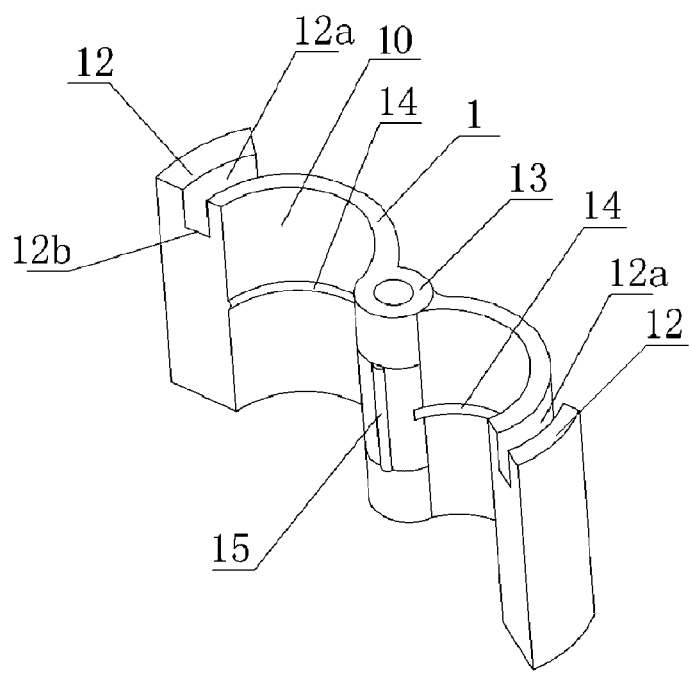
FIG. 4 is a perspective view showing the external appearance of the open sliding sleeve of the present invention.

As shown in FIGS. 3 and 4, the sliding sleeve 1 can be formed into a closed or open structure. If the sliding sleeve 1 is formed into a closed structure (as shown in FIG. 3), the locking body 12 is a protruding portion radially extending from the sliding sleeve 1. The clasping portion 12a is provided on the protruding portion. The inner wall of the hole 10 encircling the sliding sleeve 1 is provided with positioning ribs 14. The positioning ribs are formed into strips or grains and are intermittently arranged. The inner diameter of the positioning rib 14 is slightly smaller than the outer diameter of the supporting rod 3. The outer edge of the supporting rod 3 is circumferentially provided with positioning grooves 31 (as shown in FIG. 7). The positioning ribs 14 are used to elastically engage with the positioning grooves 31.

If the sliding sleeve is formed into an open structure, the wall face opposing to the open groove 11 of the sliding sleeve 1 is axially provided with a hinge 13 functioning as a shaft-and-pin mechanism. Similarly, the inner wall of the hole 10 of the sliding sleeve 1 is circumferentially provided with positioning ribs 14. The positioning ribs are formed into strips or grains and are intermittently arranged. The inner diameter of the positioning rib 14 is slightly smaller than the outer diameter of the supporting rod 3. The positioning ribs 14 are used to elastically engage with the positioning grooves 31. Further, the inner wall of the hole 10 of the sliding sleeve 1 adjacent to the hinge 13 is axially provided with ribs 15 for positioning the opening and closing actions.

Figure 6:
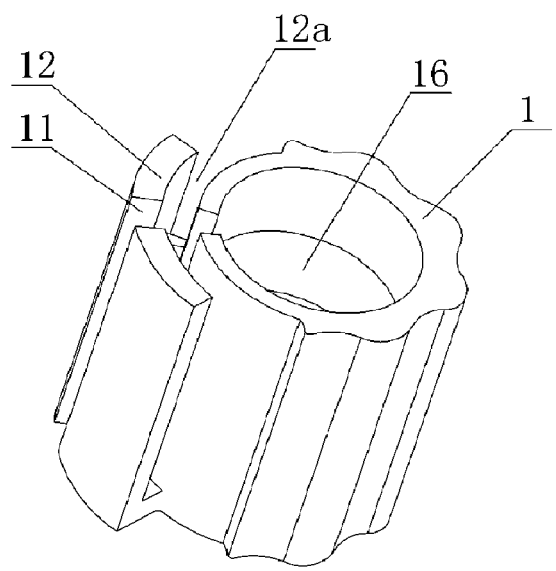
FIG. 6 is a perspective view showing that the sliding sleeve of the present invention is provided with a layer of soft rubber therein.

As shown in FIG. 6, the inner wall of the hole 10 encircling the sliding sleeve 1 is provided with a layer of elastic soft rubber 16. Alternatively, the whole inner wall of the hole 10 of the sliding sleeve 1 can be formed into a rough wall face. The profile and dimension of the hole 10 of the sliding sleeve 1 can mate with those of the supporting rod 3 with circular, oval or other shape.

Further, the locking sleeve can be a flat plane, arc plate, angled plate or the plate with other shapes. The locking groove 21 can be arranged in a vertical or transverse direction of the locking sleeve 2. The opening of the groove is arranged in an upward, downward, leftward or rightward orientation. Further, the locking sleeve 2 can also be a rod. The locking groove 21 can be formed by means of bending the rod. Between the locking sleeve 2 and the frame body 40 of the shelf, a sleeve seat 22 (as shown in FIG. 11) can be provided and formed into a plate-like or disk-like shape.

Figure 8:
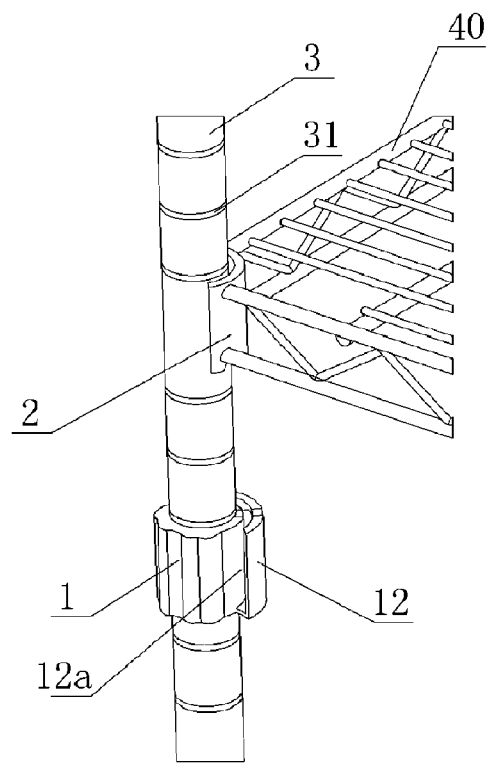
FIG. 8 is an exploded view showing the structure of FIG. 7 in assembling.

As shown in FIGS. 7 and 8, the first embodiment of the present invention can be applied to a net-like shelf. The sliding sleeve 1 is a closed sleeve. The locking sleeve 2 is an arc plate. In this embodiment, the supporting rod 3 is connected with a horizontal net-like frame body 40 of the shelf. The procedure of the assembling of the shelf is as follows. After the sliding sleeve 1 is inserted into the suitable position of the supporting rod 3, the locking sleeve 2 in the corner of the frame body 40 of the shelf is inserted into the recessed clasping portion 12a of the sliding sleeve 1. With the inward shrinkage of the open groove 11, the supporting rod 3 can be fixedly connected to the frame body 40.

Figure 9:
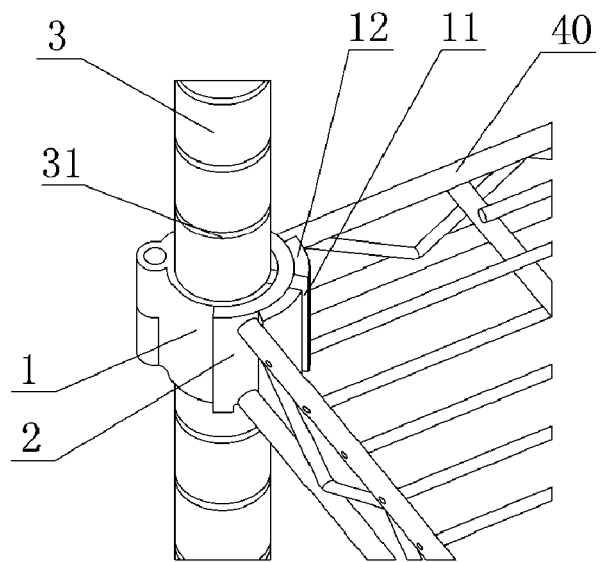
FIG. 9 is an assembled view showing that the second embodiment of the present invention is applied to a net-like shelf.
Figure 10:
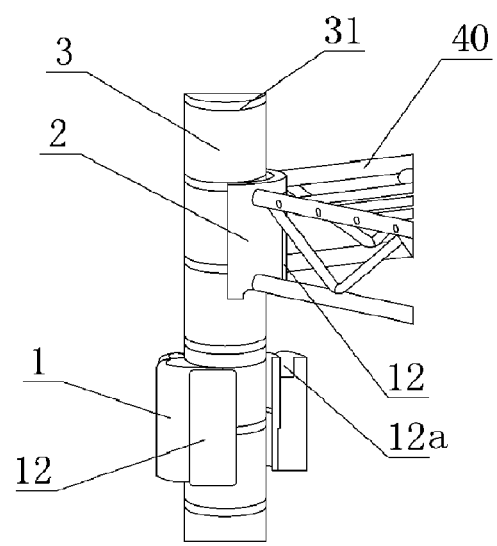
FIG. 10 is a schematic view showing the structure of FIG. 7 before assembling.

As shown in FIGS. 9 and 10, the second embodiment of the present invention can be applied to a net-like shelf. The sliding sleeve 1 is an open sleeve. The locking sleeve 2 is also an arc plate. The procedure of the assembling of the shelf is as follows. The sliding sleeve 1 is radially inserted into the suitable position of the supporting rod 3 and the open sliding sleeve 1 is closed. Then, the locking sleeve 2 in the corner of the frame body 40 of the shelf is inserted from the top into the clasping portion 12a of the sliding sleeve 1. As a result, the supporting rod 3 can be fixedly connected to the frame body 40.

Figure 11:
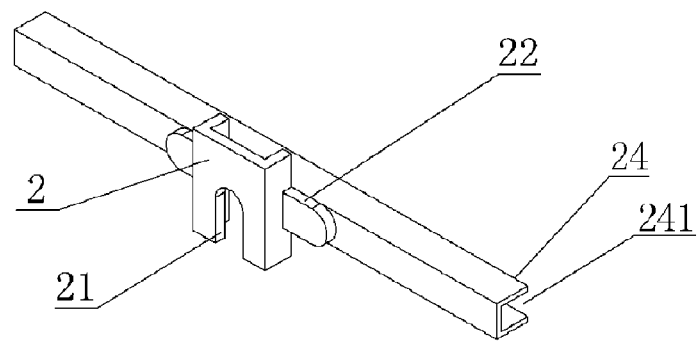
FIG. 11 is a schematic view showing the structure in which the locking sleeve of the third embodiment of the present invention is an U-shaped plate.
Figure 12:
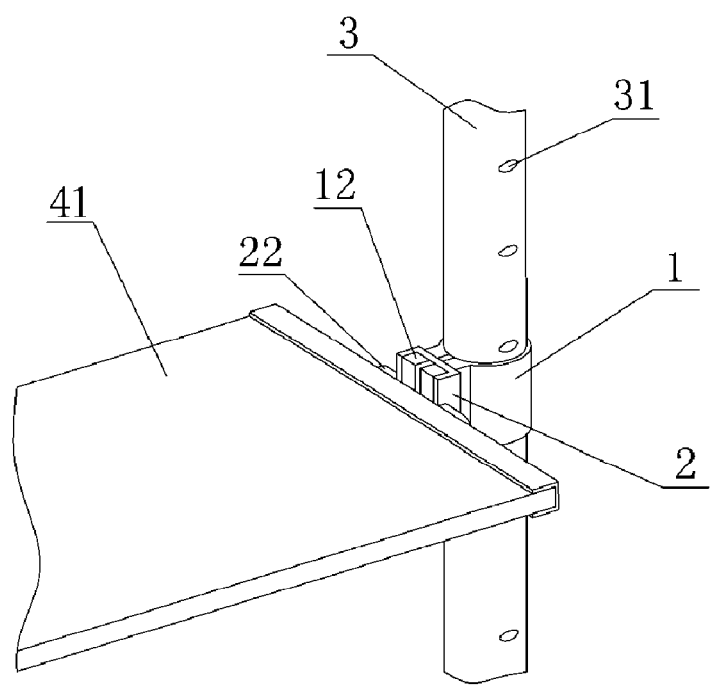
FIG. 12 is a schematic view showing the assembling of the parts in FIG. 11.

As shown in FIGS. 11 and 12, the third embodiment of the present invention can be applied to a plate-like shelf The sliding sleeve 1 can be a closed or open structure. The locking sleeve 2 is a horseshoe-shaped plate having a locking groove 21. The back of the locking sleeve 2 is fixedly connected with a sleeve seat 22 for combining with a connecting piece 24 having a "C-shaped" cross section. A plate-like frame body 41 can be inserted into the opening 241 of the connecting piece 24. The procedure of assembling the sliding sleeve 1 with the locking sleeve 2 in this embodiment is identical to that in the first embodiment.

Figure 13:
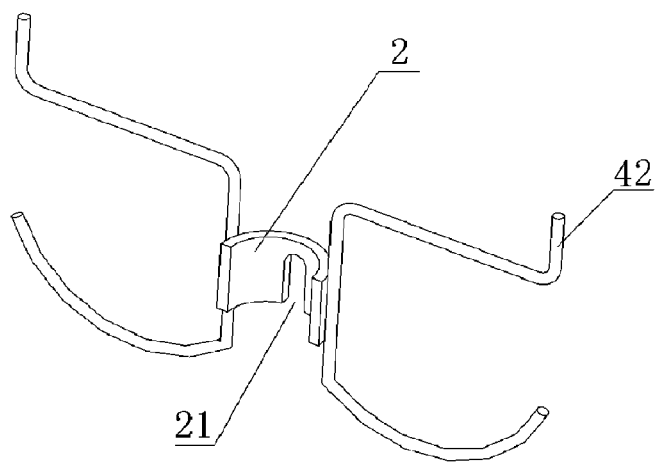
FIG. 13 is a schematic view showing that the locking sleeve of the forth embodiment of the present invention is combined with a rod-like hanger.
Figure 14:
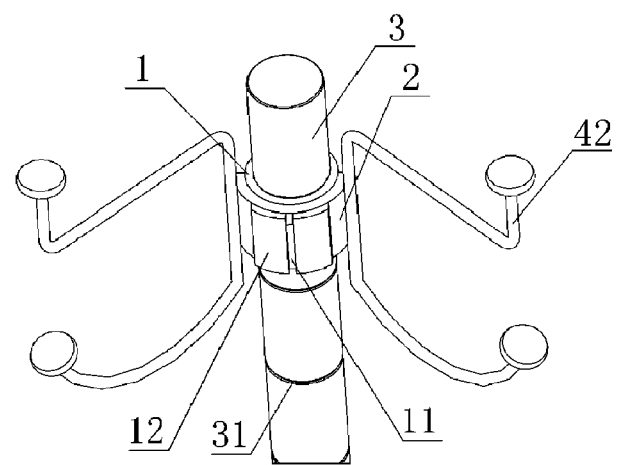
FIG. 14 is a schematic view showing the assembling of the parts in FIG. 13.

As shown in FIGS. 13 and 14, the forth embodiment of the present invention can be applied to a hook shelf. The sliding sleeve 1 can be a closed or open structure. The locking sleeve 2 is an arc plate having a locking groove 21. The hook shelf 42 shown in the figure is fixed to both ends of the locking sleeve 2. The procedure of assembling the sliding sleeve 1 with the locking sleeve 2 in this embodiment is identical to that in the first embodiment.

Figure 15:
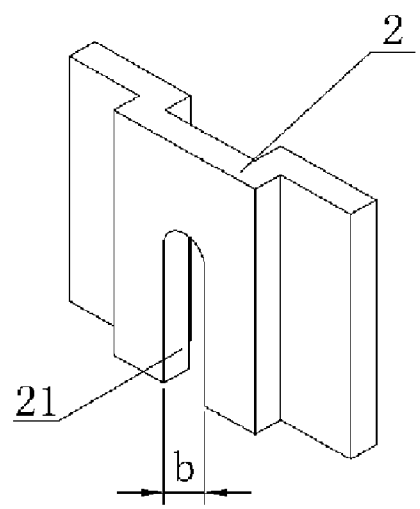
FIG. 15 is a schematic view showing the structure of the fifth embodiment of the present invention.
Figure 16:
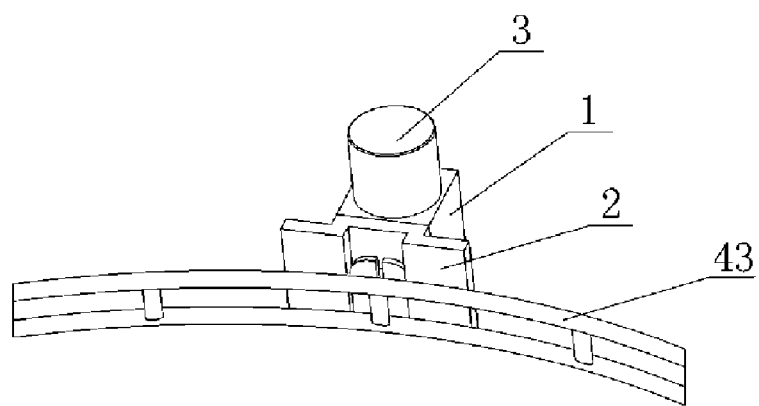
FIG. 16 is a view showing the embodying state of FIG. 15.

As shown in FIGS. 15 and 16, the fifth embodiment of the present invention can be applied to a circular shelf. The sliding sleeve 1 can be a closed rectangular sleeve. The locking sleeve 2 is a right-angled groove-like plate having a locking groove 21. On this right-angled groove-like plate, a common angled bracket (not shown) is provided for connecting with the circular frame body 43. The procedure of assembling the sliding sleeve 1 with the locking sleeve 2 in this embodiment is identical to that in the first embodiment.

Figure 17:
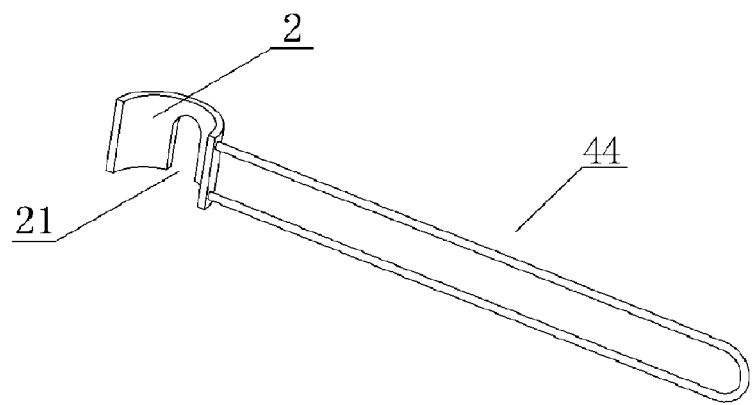
FIG. 17 is a schematic view showing the structure of the sixth embodiment of the present invention.
Figure 18:
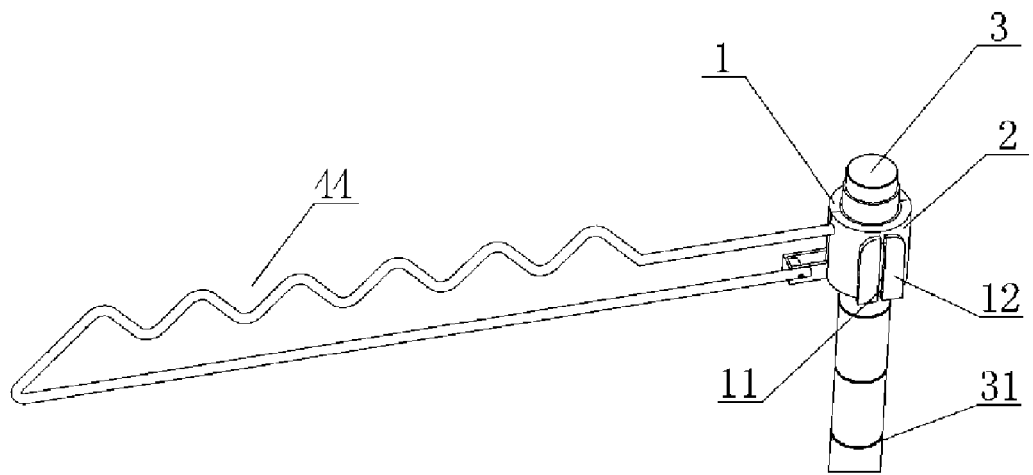
FIG. 18 is a view showing the embodying state of FIG. 17.

As shown in FIGS. 17 and 18, the sixth embodiment of the present invention can be applied to a hanger. The sliding sleeve 1 can be a closed or open structure. The locking sleeve 2 is an arc plate having a locking groove 21. The frame body 44 of the hanger shown in the figure is fixedly connected to the outer edge of one end of the locking sleeve 2. The procedure of assembling the sliding sleeve 1 with the locking sleeve 2 in this embodiment is identical to that in the first embodiment.

Figure 19:
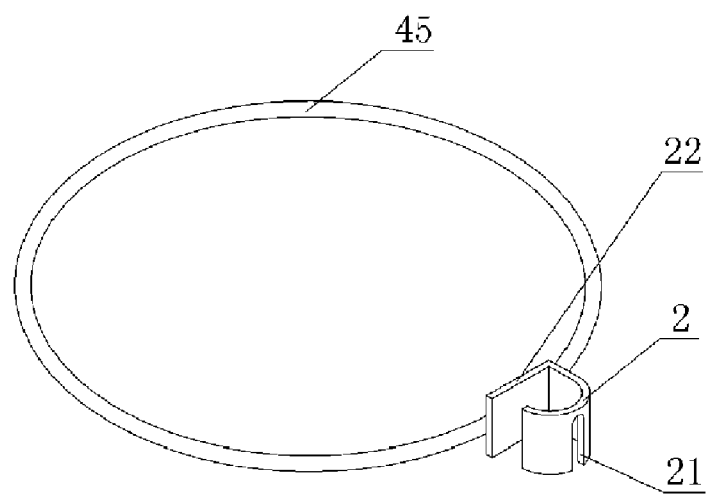
FIG. 19 is a schematic view showing the structure in which the locking sleeve of the seventh embodiment of the present invention is provided with a sleeve base.
Figure 20:
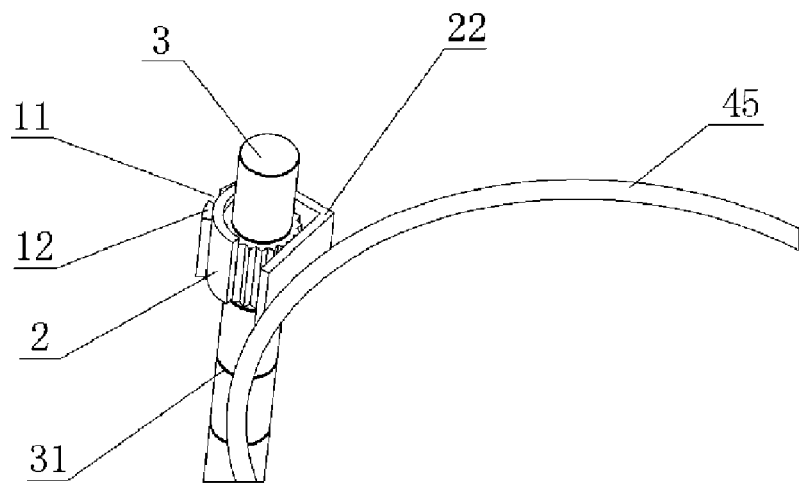
FIG. 20 is a view showing the embodying state of FIG. 19.

As shown in FIGS. 19 and 20, the seventh embodiment of the present invention can be applied to an annular shelf. The sliding sleeve 1 can be a closed or open structure. The locking sleeve 2 is an arc plate having a locking groove 21. One end of the locking sleeve 2 is provided with a plate-like sleeve seat 22 for connecting with the annular frame body 45. The procedure of assembling the sliding sleeve 1 with the locking sleeve 2 in this embodiment is identical to that in the first embodiment.

Figure 21:
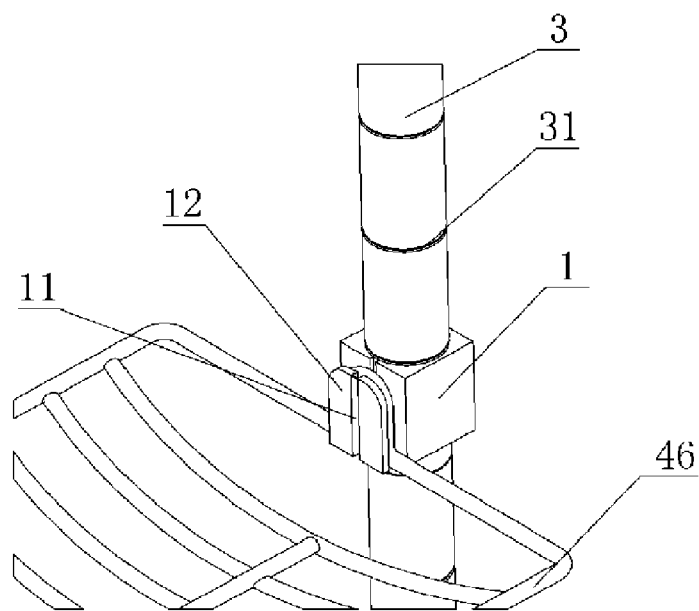
FIG. 21 is a schematic view showing the structure in which the locking sleeve of the eighth embodiment of the present invention is constituted of rods.
Figure 22:
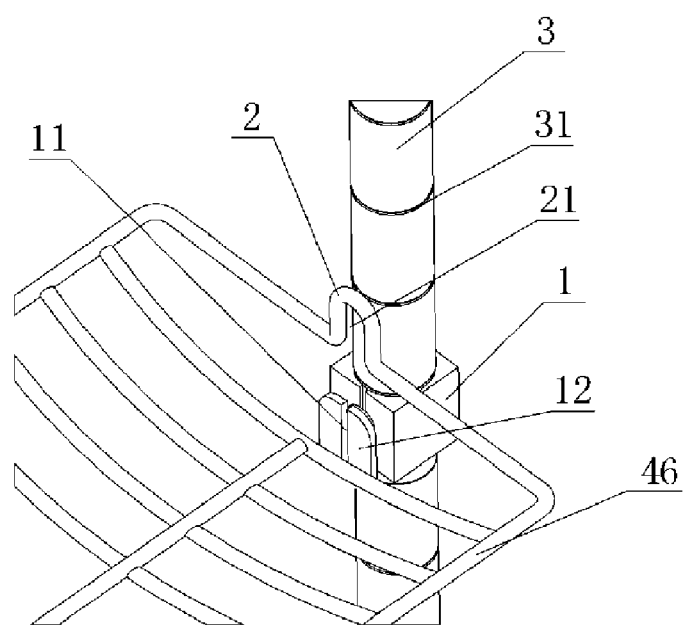
FIG. 22 is a view showing the embodying state of FIG. 21.

As shown in FIGS. 21 and 22, the eight embodiment of the present invention can be applied to a basket-like shelf The sliding sleeve 1 is a closed rectangular sleeve. The locking sleeve 2 is formed by means of bending a rigid rod and formed with a locking groove 21. With the connection between the sliding sleeve 1 and the locking sleeve 2, the frame body 46 of the basket-like shelf can be fixedly connected to the supporting rod 3. The assembling procedure in this embodiment is identical to that in the first embodiment.

Figure 23:
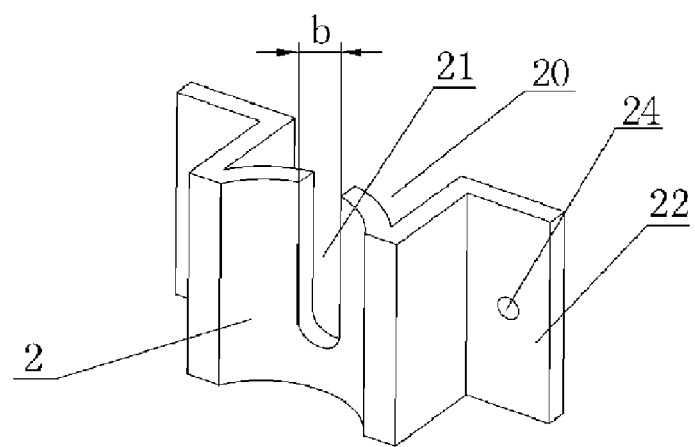
FIG. 23 is a schematic view showing the way of using in which the ninth embodiment of the present invention is applied to a fixed article.
Figure 24:
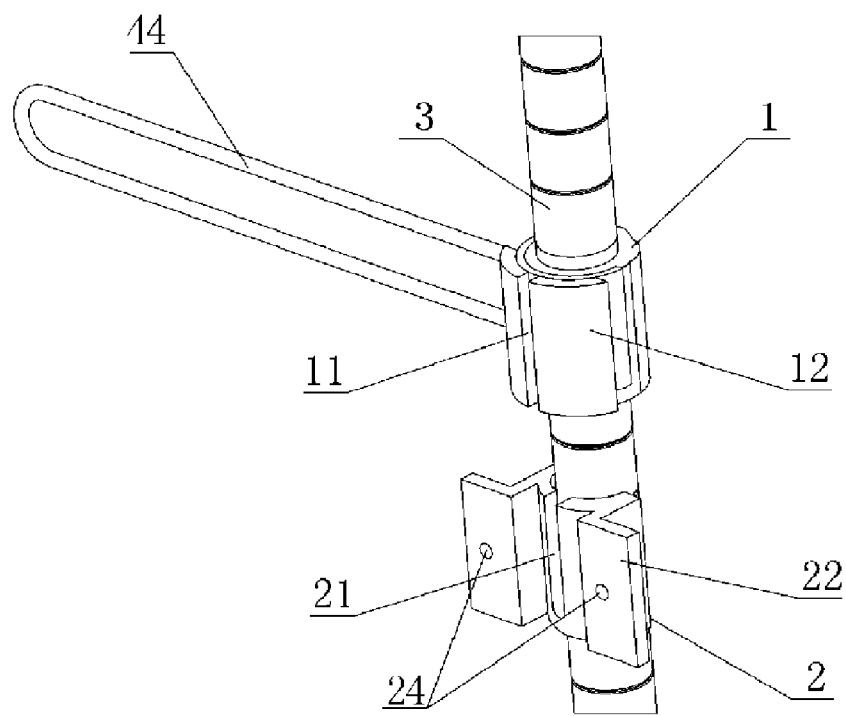
FIG. 24 is a view showing the embodying state of FIG. 23.

As shown in FIGS. 23 and 24, the ninth embodiment of the present invention can be applied to a fixed article. The locking sleeve 2 comprises an arc portion 20 and sleeve seats 22 on both sides. The arc portion has a locking groove 21, and the sleeve seat 21 has a fixing hole 24. The locking sleeve 2 can be fixedly mounted to the wall or other fixed article by screws. The opening of the locking groove 21 is arranged upwardly. The frame body 44 of the shelf is provided on the sliding sleeve 1. In this way, by firstly connecting the sliding sleeve 1 and the locking sleeve 2 in the same manner as that in the previous embodiment, or by fixing the locking sleeve 2 onto the desired fixed article, then, the sliding sleeve 1 can be connected to the locking sleeve 2. As a result, the frame body 44 of the shelf can be mounted on any fixed article.

Figure 25:
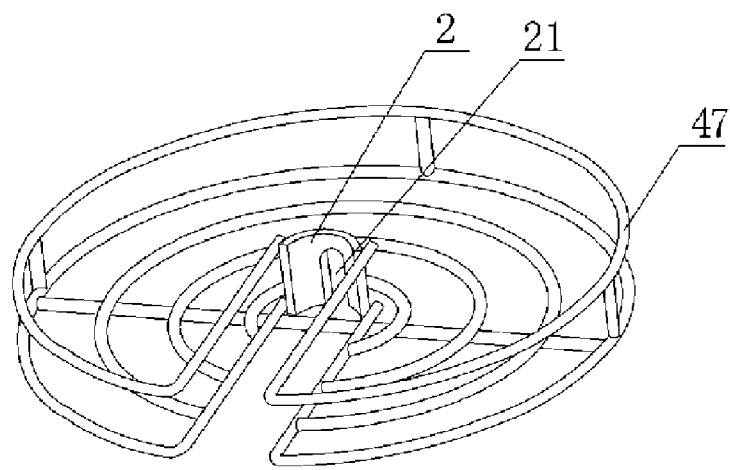
FIG. 25 is a schematic view showing the structure in which the locking sleeve of the tenth embodiment of the present invention is combined with a disk-like hanger.
Figure 26:
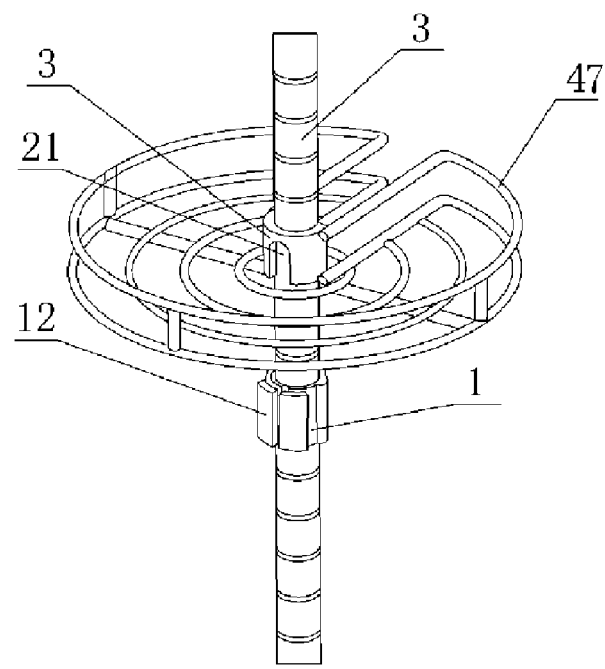
FIG. 26 is a view showing the embodying state of FIG. 25.

As shown in FIGS. 25 and 26, the tenth embodiment of the present invention can be applied to a disk-like shelf. The sliding sleeve 1 can be a closed or open structure. The locking sleeve 2 is an arc plate having a locking groove 21 and is fixedly connected to the frame body 47 of the disk-like shelf (e.g. by riveting or welding). The assembling procedure in this embodiment is identical to that in the first embodiment.

As shown in FIG. 27, the eleventh embodiment of the present invention can be applied to a rod body. The clasping portion on the sliding sleeve 1 can be a protruding clasping portion 12c. The locking groove 21 of the locking sleeve 2 is provided with a locking edge 210 for restricting the movement of the locking sleeve 2 in the radial direction of the sliding sleeve 1 after the locking sleeve 2 is inserted into the clasping portion 12c. The assembling procedure in this embodiment is identical to that in the first embodiment.

Although the present invention has been described with reference to the foregoing preferred embodiments, it will be understood that the invention is not limited to the details thereof Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A shelf connector for mounting a shelf on a supporting rod, comprising:

a sliding sleeve (1) mounted on a supporting rod, the sliding sleeve formed with a locking body (12), the locking body (12) provided with an open groove (11) along the axial direction of the sliding sleeve (1), the locking body (12) provided on both sides of the open groove (11) with a clasping portion (12*a*/12*c*) projecting outwardly from the sliding sleeve, at least one recessed introducing section (12*b*) being provided on the sliding sleeve (1) above the clasping portions (12*a*/12*c*); and a locking sleeve (2) connected to a shelf, the locking sleeve having a single locking groove (21), the locking sleeve being received on the sliding sleeve within the introducing section such that, a width of the open groove (11) is compressively reduced by insertion of the clasping portions (12*a*/12*c*) into the locking groove (21), wherein a width of the locking groove (21) is slightly smaller than a width of the clasping portions (12*a*/12*c*), the sliding sleeve (1) comprising an open structure for directly clasping on the supporting rod (3) an inner wall of the sliding sleeve (1) opposite to the open groove (11) comprising an axially extending hinge (13) functioning as a shaft-and-pin mechanism for pivotally opening and closing the sliding sleeve to receive the supporting rod, the inner wall of the sliding sleeve (1) adjacent to the hinge (13) comprising an integrally formed axially extending rib (15) which frictionally engages the supporting rod for positioning the opening and closing actions of the hinge (13) on the supporting rod.

2. The shelf connector according to claim 1, wherein the locking body (12) is a protruding portion extending outwardly in the axial direction of the sliding sleeve (1).

3. The shelf connector according to claim 1, wherein the inner wall of the sliding sleeve (1) is circumferentially and intermittently provided with positioning ribs (14), the inner diameter of each positioning he positioning ribs (14) is slightly smaller than the outer diameter of the supporting rod (3), an outer wall of the supporting rod (3) is formed with positioning grooves (31) for elastically engaging with the positioning ribs (14).

4. The shelf connector according to claim 1, wherein the locking sleeve (2) is a flat plate, arc plate or angled plate, the locking groove (21) is arranged in a vertical or transverse direction of the locking sleeve (2), and the opening of the locking groove is provided in an upward, downward, leftward or rightward orientation.

5. The shelf connector according to claim 4, wherein a sleeve seat (22) is provided between the locking sleeve (2) and the frame body of the shelf, and the sleeve seat (22) is a plate or rod.

6. The shelf connector according to claim 1, wherein the locking sleeve (2) is a rod, and the locking groove (21) is formed by means of bending the rod.

7. The shelf connector according to claim 6, wherein a sleeve seat (22) is provided between the locking sleeve (2) and the frame body of the shelf, and the sleeve seat (22) is a plate or rod.

* * * * *